COMPUTER INTERRUPT CIRCUIT

Filed March 1, 1966

INVENTORS
Leonard C. Vercellotti and
Auseklis Brastins.
BY E. F. Possessky
ATTORNEY

United States Patent Office 3,440,628

Patented Apr. 22, 1969

3,440,628

COMPUTER INTERRUPT CIRCUIT

Leonard C. Vercellotti, Penn Hills Township, Verona, and Auseklis Brastins, Wilkinsburg, Pa., assignors to Westinghouse Electric Corporation, Pittsburgh, Pa., a corporation of Pennsylvania Filed Mar. 1, 1966, Ser. No. 530,923

Int. Cl. G11b 5/00, 5/44

U.S. Cl. 340—174 7 Claims

The present invention relates to computer input and output circuitry and more particularly to computer interrupt circuits.

Efficient computer operation is promoted by the use of interrupt circuitry which allows the computer to carry out instructions and programs as operations are being completed by relatively slowly functioning input and output equipment and which further causes the computer to respond rapidly to such equipment when a new input is ready for computer entry or a new computer output can be accepted. Thus, an interrupt subsystem provides for coordination in the functioning of the computer with that of equipment such as typewriters, card or tape readers, tape punches, analog input systems, contact closure output systems or process plant input contact systems.

As an illustration, an input interrupt circuit can signal the computer when an input is ready for entry and the computer regulates its own operation for acceptance of the input. A direct call up is then made for a program in the computer memory. In relatively small capacity computers, the computer main frame itself is diverted from its running program to scan an interrupt input register and determine which input has caused the interrupt. In larger machines, the identification function is normally performed by an auxiliary scanner but the same end result is reached, i.e. the interrupt input calls up a new program from the computer memory. After responding to all current input interrupts, the computer continues its execution of programs until the next interrupt occurs.

An input interrupt subsystem can be illustrated in greater detail by consideration of a process computer system in which a large number of variables may be instrumented or monitored to generate a correspoinding number of different buffer inputs in the form of data words or logic signals. An interrupt circuit may be associated with each logic element or contact input and each data word register input, and after the computer identifies the source of an interrupt circuit signal the corresponding buffer input is coupled to the computer. If two or more available buffer inputs coexist and the computer can accept only one input at any one time, the interrogation sequence establishes the order in which inputting occurs. Fast computer operation results in an acceptably small percentage of the total computer use time being devoted to slow peripheral operations.

One common interrupt circuit arrangement includes the use of a square loop magnetic core which serves to store an interrupt command as well as to isolate electrically the interrupt input circuits from the computer ground. Although the interrupt input provides the energy to set the core, a synchronizing pulse called a probe pulse is generated by the computer to prevent interference between the input signal which sets the core and a computer generated signal which interrogates the core. Thus, in the process computer example, the computer may generate a probe pulse train which is applied to all of the interrupt circuits to result in setting the interrupt core of any particular interrupt circuit if the buffer input associated therewith is in an inputting state during the application of a probe pulse. Commonly, a threshold switch device allows a core set pulse to flow in a core set winding if the probe pulse and an interrupt input drive voltage of adequate amplitude occur simultaneously and produce the threshold voltage level across the threshold device.

The response voltage which occurs when a core is set is utiilzed to signal the computer that a "hit" has occurred. The computer then begins the interrogation sequence or interrupt scan during which the various interrupt cores are successively pulsed to identify and reset the hit cores and thereby identify the location of its next instruction.

To function properly, the interrupt circuitry desirably operates with high noise immuity and desirably produces a single core set pulse for a single interrupt input drive signal or variable duration. Successive core set pulses which duplicate a single interrupt drive command result in faulty information and computer time wastage, and failure to produce a core set pulse in response to an interrupt drive command results in omitted or deferred computer operations.

It is also often desirable that the computer maintain a fast interruption rate and a correspondingly fast core reset rate so that the working data for the computer programs are kept highly current. In some computer designs, a fast probe pulse rate may be used primarily for reasons other than information currency. Thus, fast pulse circuitry used in the computer for some other purposes, such as memory scan, can serve the additional purpose of interrupt core probing without the requirement of any additional electronic circuitry to establish a slower pulse rate.

One difficulty with interrupt circuit arrangements has been the development of inadequate current pulses for core setting in response to interrupt drive commands. Another difficulty has been the development of multiple successive core setting current pulses when only a single core set pulse should be generated. The difficulties have been observed to become more pronounced at higher interruption rates because commercially available threshold switch devices characteristically are sensitive to the rate of rise of the probe voltage pulses as well as probe voltage pulse amplitude per se. Tight specifications on the threshold switch device provide only a limited and expensive solution to the problem.

In accordance with the broad principles of the present invention, a novel computer interrupt circuit is actuable by an input interrupt drive circuit and comprises a circuit loop in which there is connected a switching device for controlling the flow of memory set current pulses through a memory device. Means are provided for causing the switch to become conductive in response to an input drive voltage and a computer probe voltage pulse only after the drive voltage has reached a predetermined level.

In this instance, the switch is preferably a controlled switch and a control circuit is responsive to the input drive voltage and the computer probe voltage to drive the controlled switch to a conductive state only after the input drive voltage reaches the predetermined level. The control circuit is substantially non-responsive to the rate of rise of the probe voltage pulses and premature interrupt loop operation and consequent core set pulses of inadequate magnitude are thus avoided. After the memory device is set by the input drive current, the amplitude of the input drive current is sufficiently high to hold the controlled switch conductive and simultaneously is sufficiently low to prevent multiple memory settings from the same continuing input drive voltage.

It is, therefore, an object of the invention to provide a novel computer interrupt circuit which operates with improved reliability.

Another object of the invention is to provide a novel computer interrupt circuit which operates reliably at relatively high computer interruption rates.

A further object of the invention is to provide a novel computer interrupt circuit in which the rate of rise of computer probe voltage pulses has substantially no effect on the setting of an output magnetic core coupled in the circuit.

These and other objects of the invention will become more apparent upon consideration of the following detailed description along with the attached drawings, in which.

Figures 1, 1A:
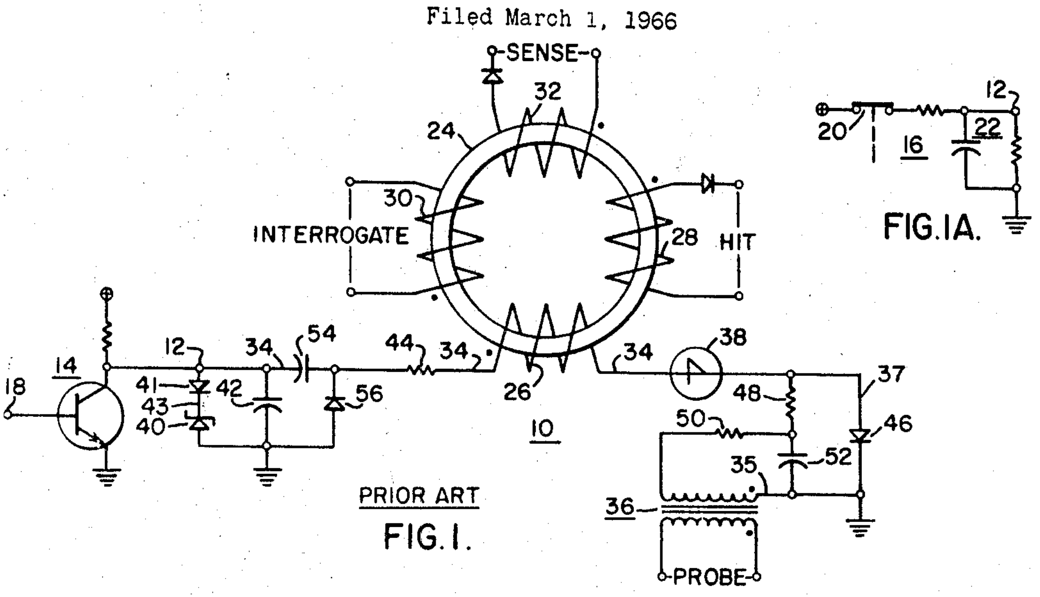
FIGURE 1 shows a schematic diagram of a typical prior art computer interrupt circuit.
FIG. 1A shows a schematic diagram of a modified input drive circuit for the interrupt circuit of FIG. 1.

More specifically, there is shown in FIG. 1 a typical prior art computer interrupt circuit 10 for which an input interrupt drive voltage is provided at junction 12 by a suitable input circuit such as a transistor switch circuit 14 or a relay contact circuit 16 (FIG. 1A). The circuit 14 or 16 is actuated when, for example, a computer input buffer device (not shown) with which it is associated has a data word or signal ready for computer entry.

In particular, the input drive circuit 14 is actuated when voltage at transistor base terminal 18 causes the transistor collector-emitter path to become non-conductive. In actuation of the drive circuit 16, a relay is operated to close contact 20. Some noise rejection is provided by the interrupt circuitry, and the relay contact circuit 16 includes an RC filter 22 to provide additional noise rejection and to prevent multiple operation of the interrupt circuit 10 as a result of relay contact closure bounce. When the circuit 14 or 16 is actuated, the potential at the junction 12 rises toward a predetermined level which in effect is a command for a computer interrupt.

At the output of the prior art computer interrupt circuit 10, a memory element in the form of a square loop magnetic core 24 is provided for temporarily storing the interrupt command until the computer is ready for its acceptance and for isolating the interrupt circuit 10 from the computer ground. On the core 24, there is provided a set winding 26 which forms a part of the computer interrupt circuit 10 and a hit winding 28 which is connected (not indicated) to the computer so as to produce a hit signal when the magnetic core material is driven to its positive saturation state by a set pulse in the set winding 26.

An interrogation winding 30 is also provided on the core 24 for the purpose of applying computer timed interrogation pulses thereto after a hit signal has been generated by the winding 28. An interrogation pulse drives the core material to its negative saturation state if it previously had been in its positive saturation state, and in so doing produces a pulse signal in a sense winding 32 which is coupled to the computer to identify the particular interrupt core 24 determined to have been in a hit state. Thus, for hardware economy, a single memory device such as a flip-flop element (not shown) commonly is coupled to a plurality of interrupt cores 24 to indicate to the computer when a hit has occurred in one of the cores 24, and the computer determines which of the cores have been hit by the interrupt core interrogation or scan. When a particular interrupt core has been identified as having been hit, its associated input buffer device is coupled to the computer for entry of its data word or logic signal. If two or more interrupt cores coexist in a set state, the sequence of interrogation establishes which interrupt has the higher priority.

It is desirable that the core 24 be set with substantial drive energy when an interrupt command is to be completed. Thus, the computer interrupt circuit 10 includes a circuit loop 34 which is intended to direct current through the core set winding 26 only after the drive voltage at junction 12 reaches a predetermined level and a computer probe voltage pulse is produced across the secondary of a suitable pulse transformer 36 in branch 35 of the loop 34. Under this loop voltage condition, a threshold switch 38 is switched to conduct the core set current. To prevent simultaneous core set and reset pulses, the computer probe and interrogation pulses are time displaced.

A capacitor 42 connected between the loop 34 and the common junction delays drive voltage rise at the junction 12 but serves as a storage medium to increase the set winding current pulse amplitude when voltage breakover occurs in the switch 38. After switch breakover, current flows in the loop 34 from the junction 12 and the storage capacitor 42 through a current limiting resistor 44, the set winding 26, the switch 38 and a current directing diode 46 in loop branch 36 to the common junction. Resistors 48 and 50 both limit current through the pulse transformer secondary and form with capacitor 52 a filter which limits probe rate of voltage rise.

The core set current flows through the set winding 26 and the switch 38 until low current and low voltage loop conditions cause the switch 38 to reset to its nonconductive state. In order generally to prevent refiring of the threshold switch 38 in response to the magnitude of the same continuing input drive voltage on subsequent computer probe voltage pulses, a capacitor 54 is connected in the circuit loop 34 for charging by current from the junction 12 and discharge current from the capacitor 42 during the breakover conduction time of the switch 38. Thus, when the switch 38 stops conducting, the potential at the junction 12 must rise to a higher level as determined by the charged voltage of the capacitor 54 before a breakover voltage can be applied to the switch 38. The circuit design is arranged such that a Zener diode 40, connected in a path 41 to ground and protected against back voltage by diode 42, prevents the junction 12 from reaching the higher potential required for switch refiring by voltage magnitude during the continuance of the original actuated state of the input circuit 14 or 16. In the alternative, the input circuit voltage supply can be controlled to produce an equivalent limiting effect.

When de-actuation occurs in the circuit 14 or 16, the capacitor 54 is discharged to ground through the circuit 14 or 16 and current directing diode 56. Since the capacitor 54 can have a capacitance equal to about 10% or less of the capacitance of the capacitor 42, resetting time of the computer interrupt circuit 10 for acceptance of a new input interrupt drive signal from the input circuit 14 or 16 in adequate for most application.

The threshold switch 38 can be and usually is a four layer PNPN device. Since this and other similar threshold switches characteristically are sensitive to the rate at which voltage is applied across them as well as to the voltage magnitude itself, the prior art computer interrupt circuit 10 operates unreliably under certain circumstances. Thus, if the circuit 14 or 16 has just been actuated and voltage begins to rise across the capacitor 42, a probe pulse across the secondary of the transformer 36 can reduce the switch impednace and thereby cause the threshold switch 38 to conduct current as a result of the probe pulse rise rate.

In that event, the voltage across the capacitor 42 may be so low that inadequate current will flow through the set winding 26 to produce magnetic switching of the core 24. In the alternative, a flux change may be produced in in the core 24 but the change would be insufficient to produce a hit signal in the hit winding 28 of adequate magnitude for computer command. Successive non-core setting pulses caused by successive pulses can produce ratched charging of the blocking capacitor 54 until core setting by drive voltage magnitude is prevented by the blocking voltage.

On the other hand, even if drive voltage does produce an acceptable core set pulse, the core 24 may be pulsed and set again on a subsequent computer probe pulse and after interrupt core interrogation. The multiple setting fault can occur even though the original and continuing input drive voltage at the junction 12 would otherwise have inadequate magnitude to overcome the blocking voltage of the capacitor 54 and produce switch conduction.

Figure 2:
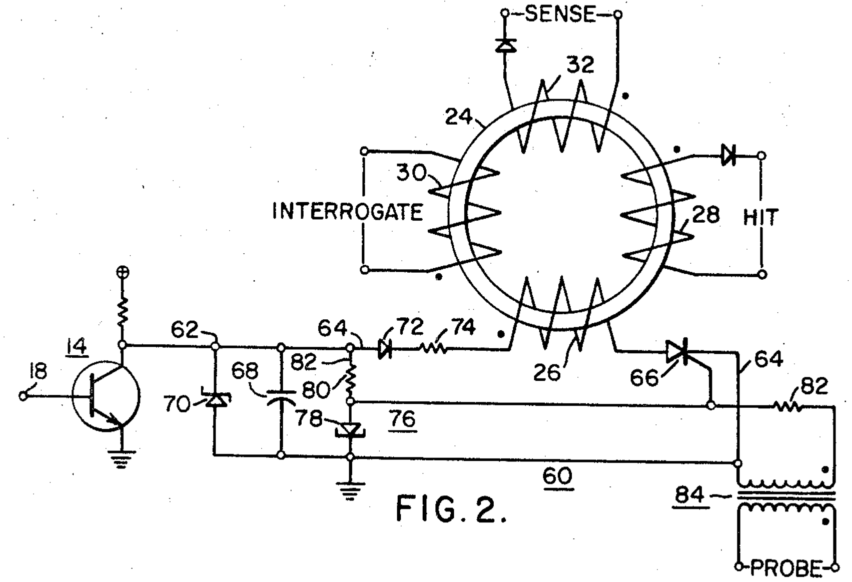
FIG. 2 shows a schematic diagram of a computer interrupt circuit arranged in accordance with the principles of the invention.

There is shown in FIG. 2 a computer interrupt circuit 60 arranged in accordance with the principles of the invention. The circuit 60 includes elements preferably arranged as separate components but integrated circuitry can be employed as desired. An input circuit such as the circuit 14 is coupled to input junction 62 and an output memory element such as the core 24 is connected at the output of the interrupt circuit 60 with the same windings provided as described in connection with FIG. 1.

A circuit loop 64 includes a switch 66 for controlling the flow of interrupt core set pulses through the set winding 26. The switch 66 is preferably a controlled switch in the form of a silicon controlled rectifier or the like. The SCR switch 66 is preferred in the FIG. 2 embodiment because it characteristically carries current pulses of sufficient amplitude and sufficiently fast rise time to produce substantial core setting energy in response to an input interrupt drive voltage. Further, silicon controlled rectifiers exhibit a latching type turn-on characteristic to assure adequate amplitude core set current pulses even if the input drive voltage should reach the predetermined core set level toward the end of a computer probe pulse. By controlled switch, it is mean to refer to a switch having a pair of circuit connection terminals with a switchable path therebetween controlled by the use of one or more additional switch terminals. For additional disclosure directed to computer interrupt circuitry in which two terminal threshold switches can be used, reference is made to a copending application entitled "Computer Interrupt Circuit" filed by L. Vercellotti and R. Johnson on Mar. 1, 1966, Ser. No. 530,924 and assigned to the present assignee.

At the input of the computer interrupt circuit 60, a storage capacitor 68 is connected between the common junction and the input junction 62 for the purpose of increasing the set winding current when the SCR switch 66 is switched from a non-conductive state to a conductive state. Interrupt circuit drive voltage is provided by an input circuit as the input circuit 14, and after actuation of the input circuit 14 the storage capacitor voltage rises as a function of time. A Zener diode 70 connected in parallel with the storage capacitor 68 limits the extent to which the storage capacitor voltage can rise.

When the capacitor voltage reaches a predetermined operating level, the SCR switch 66 is caused to become conductive and a substantial current pulse flows in the loop 64 through a current directing diode 72 and a current limiting resistor 74 and the set winding 26 to set the core 24. The set current pulse drops in amplitude as the storage capacitor 68 is discharged, and the post-discharge current value is sufficient to hold the SCR switch 66 conductive but insufficient to set the core 24 again after a core reset by a computer interrogation pulse in the core winding 30.

In order to drive the SCR switch 66 to a conductive state during the coincidence of a computer probe voltage pulse and an input drive voltage at the predetermined storage capacitor operating voltage level, and in order to do so independently of the probe pulse voltage rate of rise, a gating control circuit 76 is connected between the input junction 62 and the common junction. A tunnel diode 78 is connected in the gating circuit 76 and across the gate and cathode terminals of the SCR switch 66 to control the application of gating voltage thereto.

Current is supplied to the tunnel diode 78 through a resistor 80 in a path 82 from the input junction 62. The resistor 80 is preferably set to limit the maximum drive voltage control current through the tunnel diode 78 to a value less than the peak tunnel diode switching current value.

Tunnel diode current supply is also obtained in a local current loop including a resistor 82 and a secondary of a suitable pulse transformer 84. The computer probe voltage pulses are developed across the transformer secondary typically at a rate of one pulse every 18 microseconds. For reasons previously given, the probe and interrogation pulses supplied to the circuit 60 are time displaced. Preferably, the resistor 82 limits the probe current through the tunnel diode 78 to a relatively small fraction of the peak tunnel diode switching current value.

When the potential at the input junction 62 is lower than the predetermined core set operation level, the total current flow hrough the tunnel diode 78 from the resistor 80 and the resistor 82 is sufficiently low to retain the tunnel diode in its low voltage state. That is, the sum of the drive voltage control current and the probe control current is inadequate to cause the tunnel diode 78 to gate the SCR switch 66.

Tunnel diode switching is caused when the input drive voltage reaches the predetermined operating level. At that time, total current flow through the tunnel diode 78 during the generation of a computer probe pulse is sufficient to switch the tunnel diode 78 to its high voltage state. The SCR switch 66 is then gated and the core 24 is set by the resultant adequate current pulse in the loop 64. Since the tunnel diode 78 is insensitive to the probe voltage pulse rate of rise, the operation of the SCR switch 66 is reliably isolated from probe voltage pulse rate of rise effects so that a substantial core set pulse is always produced in response to an input drive voltage which reaches the predetermined operating voltage level. High computer interrupt rates are thus made possible. To assure narrow firing point tolerance and excellent temperature stability, the tunnel diode 78 is preferably a silicon tunnel diode.

As previously indicated, the SCR switch 66 remains conductive after the storage capacitor 68 substantially discharges because the input circuit 14 continues to supply switch holding current. The storage capacitor 68 cannot be recharged during current conduction through the SCR switch 66 and the problem of multiple core setting for a single continuing input drive voltage is thus reliably avoided.

When the input drive circuit 14 is deactuated, any remaining charge on the storage capacitor 68 is quickly discharged through the circuit 14 to the common junction. Simultaneously, the SCR switch 66 is turned off. Extremely fast computer interrupt circuit reset is thus achieved for acceptance of a new input drive voltage.

Figure 3:
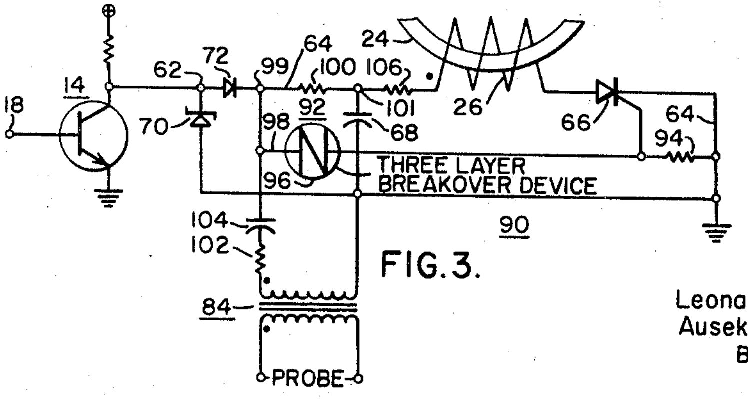
FIG. 3 shows a schematic diagram of another embodiment of the invention.

In FIG. 3 there is shown another embodiment of the invention. It is similar to the embodiment of FIG. 2 and will be described only insofar as it differs therefrom. Like reference characters are employed where appropriate.

In this case, a computer interrupt circuit 90 includes a gating control circuit 92 which is provided with a drive resistor 94 connected across the control terminals of the SCR switch 66. Current flow through the gating path in the SCR switch 66 and through the resistor 94 is controlled by a three layer threshold switch device 96 which is connected with the resistor 94 and the SCR switch gating terminals in a path 98 between the common junction and a junction 99 in the core set loop 64. The threshold device 96 can be a three layer device such as that marketed by General Electric under the trade name of "Diac," and it is insensitive to voltage rate of rise effects and thus is suitable for SCR gating control. It is noted that direct use of three layer threshold switches in the core set loop 64 in place of the SCR switch 66 is prohibited since presently available types do not have suitable current conduction and latching voltage properties.

A resistor 100 is connected in the loop 64 between the junction 99 and the storage capacitor 68 to form one leg of a voltage divider. The other leg of the voltage divider is formed by a resistor 102 and a capacitor 104 connected in series with the pulse transformer secondary between the junction 99 and the common junction. When core set current is caused to flow in the core set loop 64 by SCR switch conduction, resistor 106 limits the magnitude of the core set current pulse.

The core 24 and its windings are only partially shown in FIG. 3 but they are identical with the core and windings of FIG. 2.

After the input drive circuit 14 is actuated and the storage capacitor voltage is still at a level below the predetermined operating level, computer probe voltage pulses produce current flow in the voltage divider loop so that voltage drops are produced across the resistors 100 and 102. The resultant potential at the junction 99 is less than the threshold level of the device 96 and the SCR switch 66 remains ungated.

When the predetermined operating voltage level is developed across the storage capacitor 68, the potential at capacitor junction 101 added with the voltage drop produced across the resistor 100 by a computer probe current pulse causes the potential at the junction 99 to reach the threshold level of the device 96. Gating current is then conducted by the threshold device 96 to operate the SCR switch 66 which immediately conducts a core set current pulse in the loop 64. Since the three layer device 96 is substantially insensitive to the probe voltage rate of rise, a substantial core set pulse is always generated in response to an input drive voltage which reaches the predetermined capacitor voltage operating level.

When the storage captcitor 68 is substantially discharged, the potential at the junction 99 is dropped and the three layer device 96 is cut off. Holding current continues to flow in the SCR switch 66 from the input circuit 14 as in the embodiment of FIG. 2, and probe pulse voltage is again dropped across the resistors 102 and 100 without breakover in the gating control switch 96. The holding current is inadequate to produce a new core setting after core reset by an interrogation pulse and during the continuation of the same input drive voltage from the input circuit 14. The multiple core set problem is thus reliably avoided.

With input circuit deactuation, any remaining charge on the storage capacitor 68 is discharged through the SCR switch 66 until the SCR switch 66 is switched to a nonconductive state. The computer interrupt circuit 90 is then reset for a new input drive voltage.

What is claimed is:

1. A computer interrupt circuit coupled to a magnetic core output and actuable by an interrupt drive voltage at an input junction, said circuit comprising a circuit branch connected between the input junction and a common junction, said circuit branch including a switch in series with a winding of said core, an element across which computer probe voltage pulses are developed, means for causing said switch to become conductive in response to the input drive and probe pulse voltages only after the drive voltage has reached a predetermined level.

2. A computer interrupt circuit as set forth in claim 1 wherein said switch is a controlled switch and the last-mentioned means comprises a circuit for gating and controlled switch in response to the drive and probe voltages substantially without sensitivity to the probe pulse rate of rise.

3. A computer interrupt circuit as set forth in claim 2 wherein said gating circuit includes a tunnel diode, and means for directing current to said tunnel diode from said probe pulse element and from the input junction.

4. A computer interrupt circuit as set forth in claim 2 wherein said gating circuit includes a three layer threshold device connected in a path between the common junction and a threshold junction in said circuit branch, and a circuit loop including said probe pulse element connected through the threshold and common junctions to control the potential at the threshold junction.

5. A computer interrupt circuit as set forth in claim 2, wherein a storage capacitor is connected in a path between the input and common junctions, said controlled switch is a controlled rectifier, and means for limiting the current through said controlled rectifier after said storage capacitor has been substantially discharged therethrough to a value in excess of the characteristic switch holding value but less than a predetermined value required for core set.

6. A computer interrupt circuit as set forth in claim 3, wherein a storage capacitor is connected between the input junction and the common junction.

7. A computer interrupt circuit as set forth in claim 4, wherein a storage capacitor is connected between the common junction and another junction between the threshold junction and said controlled switch, a resistor connected between said threshold junction and the last-mentioned capacitor junction, said probe pulse circuit loop further including said storage capacitor and said resistor.

References Cited

UNITED STATES PATENTS

| | | | |
|---|---|---|---|
| 2,954,482 | 9/1960 | Alizon | 307—88 |
| 3,071,697 | 1/1963 | Dinger | 307—282 X |
| 3,204,123 | 8/1965 | Mahoney et al. | 307—282 X |
| 3,191,060 | 6/1965 | Mahoney | 307—282 X |
| 3,209,174 | 9/1965 | Cole | 307—282 X |
| 3,244,904 | 4/1966 | Schwartz | 307—282 X |
| 3,265,955 | 8/1966 | Brown | 307—314 X |
| 3,332,074 | 7/1967 | Arnold | 340—174 |

STANLEY M. URYNOWICZ, Jr., *Primary Examiner.*

U.S. Cl. X.R.

307—88, 82, 314